(12) United States Patent
Nelson et al.

(10) Patent No.: US 12,486,867 B2
(45) Date of Patent: Dec. 2, 2025

(54) FRAME FOR MAGNETIC-FOIL BEARING

(71) Applicant: Raytheon Technologies Corporation, Farmington, CT (US)

(72) Inventors: Alexander R. Nelson, Amston, CT (US); Benstone I. Schwartz, Sanford, FL (US); Philip A. Varney, Coventry, CT (US); Andrew V. Schwendenmann, Hampden, MA (US)

(73) Assignee: RTX Corporation, Farmington, CT (US)

( * ) Notice: Subject to any disclaimer, the term of this patent is extended or adjusted under 35 U.S.C. 154(b) by 278 days.

(21) Appl. No.: 18/137,862

(22) Filed: Apr. 21, 2023

(65) Prior Publication Data

US 2024/0352966 A1 Oct. 24, 2024

(51) Int. Cl.
*F16C 32/04* (2006.01)
*F16C 17/02* (2006.01)

(52) U.S. Cl.
CPC ........ *F16C 32/0402* (2013.01); *F16C 17/024* (2013.01); *F16C 32/0474* (2013.01); *F16C 2360/23* (2013.01)

(58) Field of Classification Search
CPC .............. F16C 32/0402; F16C 17/024; F16C 32/0474; F16C 2360/23; F16C 43/02; F16C 37/00; F16C 32/048
See application file for complete search history.

(56) References Cited

U.S. PATENT DOCUMENTS

| | | | |
|---|---|---|---|
| 5,519,274 A | 5/1996 | Scharrer | |
| 6,135,640 A | 10/2000 | Nadjafi | |
| 6,469,411 B2 | 10/2002 | Lembke | |
| 6,965,181 B1 | 11/2005 | Heshmat | |
| 8,531,071 B2 | 9/2013 | Klusman | |
| 2010/0143100 A1 | 6/2010 | Sharp | |

FOREIGN PATENT DOCUMENTS

| | | | | |
|---|---|---|---|---|
| CN | 210949548 U | | 7/2020 | |
| CN | 113236671 A | * | 8/2021 | .......... F16C 32/0402 |
| CN | 113236671 B | | 3/2022 | |
| EP | 0750806 B1 | | 8/1998 | |
| KR | 100928948 B1 | | 11/2009 | |
| KR | 101562054 B1 | | 10/2015 | |
| WO | WO-2023055690 A2 | * | 4/2023 | .......... H02K 21/227 |

OTHER PUBLICATIONS

CN-113236671-A_translate (Year: 2021).*
EP Search Report for EP Patent Application No. 24171335.3 dated Sep. 20, 2024.

* cited by examiner

*Primary Examiner* — Tulsidas C Patel
*Assistant Examiner* — Mohammed Ahmed Qureshi
(74) *Attorney, Agent, or Firm* — Getz Balich LLC

(57) ABSTRACT

A bearing assembly is provided that includes a frame, a magnetic bearing stator and a foil bearing. The frame extends axially along and circumferentially about an axis. The frame includes an inner bore and a plurality of channels arranged circumferentially about the axis. The magnetic bearing stator includes a stator body and a plurality of windings. The stator body circumscribes the frame. The stator body includes a plurality of stator protrusions arranged circumferentially about the axis. Each of the stator protrusions projects radially inward into a respective one of the channels. Each of the windings is wrapped around a respective one of the stator protrusions. The foil bearing is disposed within the inner bore and retained to the frame.

18 Claims, 8 Drawing Sheets

FRAME FOR MAGNETIC-FOIL BEARING

BACKGROUND OF THE DISCLOSURE

1. Technical Field

This disclosure relates generally to a bearing and, more particularly, to an active magnetic bearing and a foil bearing.

2. Background Information

A gas turbine engine includes bearings to rotatably support various rotors. Various types and configurations of bearings are known in the art. While these known bearings have various benefits, there is still room in the art for improvement. There is a need in the art, for example, for a bearing which can reduce lubricant and/or cooling demand on turbine engine lubricant and/or cooling systems.

SUMMARY OF THE DISCLOSURE

According to an aspect of the present disclosure, a bearing assembly is provided that includes a frame, a magnetic bearing stator and a foil bearing. The frame extends axially along and circumferentially about an axis. The frame includes an inner bore and a plurality of channels arranged circumferentially about the axis. The magnetic bearing stator includes a stator body and a plurality of windings. The stator body circumscribes the frame. The stator body includes a plurality of stator protrusions arranged circumferentially about the axis. Each of the stator protrusions projects radially inward into a respective one of the channels. Each of the windings is wrapped around a respective one of the stator protrusions. The foil bearing is disposed within the inner bore and retained to the frame.

According to another aspect of the present disclosure, another bearing assembly is provided that includes a frame, a magnetic bearing stator and a foil bearing. The frame extends axially along and circumferentially about an axis. The frame includes an inner bore and a retention slot projecting radially into the frame from the inner bore. The magnetic bearing stator includes a stator body and a plurality of windings wrapped around the stator body. The magnetic bearing stator circumscribes the frame. The foil bearing includes a top foil and a bump foil. The top foil includes an arcuate top foil base and a top foil mount. The arcuate top foil base is disposed within the inner bore. The top foil mount is connected to the arcuate top foil base and projects radially into the retention slot. The bump foil includes an arcuate bump foil base and a bump foil mount. The arcuate bump foil base is disposed within the inner bore radially between the arcuate top foil base and the frame. The bump foil mount is connected to the arcuate bump foil base and projects radially into the retention slot.

According to still another aspect of the present disclosure, another bearing assembly is provided that includes a magnetic bearing stator, a frame and a foil bearing. The magnetic bearing stator includes a stator body and a plurality of windings. The stator body extends axially along and circumferentially about an axis. The stator body includes a plurality of stator protrusions arranged circumferentially about the axis. Each of the stator protrusions projects radially inward towards the axis to a respective distal end. Each of the windings is wrapped around a respective one of the stator protrusions. The frame is attached to the stator body. A portion of the frame is disposed circumferentially between and extends axially along a circumferentially neighboring pair of the stator protrusions. The foil bearing is circumscribed by the magnetic bearing stator and includes a plurality of foils secured to the portion of the frame. The foils include a top foil and a bump foil. The bump foil is radially between the top foil and the frame. The bump foil is radially between the top foil and at least one of the circumferentially neighboring pair of the stator protrusions.

Each of the channels may extend radially through the frame.

A first of the stator protrusions may be attached to the frame.

A first of the stator protrusions may be secured within a first of the channels with potting material.

The stator body may be configured as or otherwise include a stator lamination.

A first of the stator protrusions may have a first lateral width. A second of the stator protrusions may have a second lateral width that is different than the first lateral width.

A first of the stator protrusions may have a first lateral width. A second of the stator protrusions may have a second lateral width that is equal to the first lateral width.

A first of the windings may be arranged radially outboard of the frame.

The magnetic bearing stator may be axially aligned with and circumscribe the foil bearing.

The foil bearing may include a top foil and a bump foil. The top foil may be retained to the frame. The bump foil may be retained to the frame. The bump foil may be disposed radially between the top foil and the frame.

The bump foil may be configured to bias the top foil radially inward away from the frame.

The top foil may include an arcuate base and a mount. The arcuate base may be disposed within the inner bore. The mount may project radially out from the arcuate base into a retention slot in the frame.

The mount may include a flange and a rim. The flange may project radially out from the arcuate base into the retention slot. The rim may project laterally into a notch of the retention slot.

The arcuate base may extend circumferentially about the axis between opposing sides. The mount may be disposed at a circumferential intermediate position between the opposing sides.

The bump foil may include an arcuate base and a mount. The arcuate base may be disposed within the inner bore. The mount may project radially out from the arcuate base into a retention slot in the frame.

The mount may include a flange and a rim. The flange may project radially out from the arcuate base into the retention slot. The rim may project laterally into a notch of the retention slot.

The top foil may be a first top foil. The foil bearing may also include a second top foil and a third top foil. The second top foil may be arranged circumferentially between the first top foil and the third top foil. The second top foil may be disposed radially between the first top foil and the frame. The third top foil may be disposed radially between the second top foil and the frame.

The bearing assembly may also include a rotating structure, and the rotating structure may be configured as or otherwise include a magnetic bearing rotor. The rotating structure may be configured to rotate about the axis. The foil bearing may circumscribe and may be axially aligned with the magnetic bearing rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
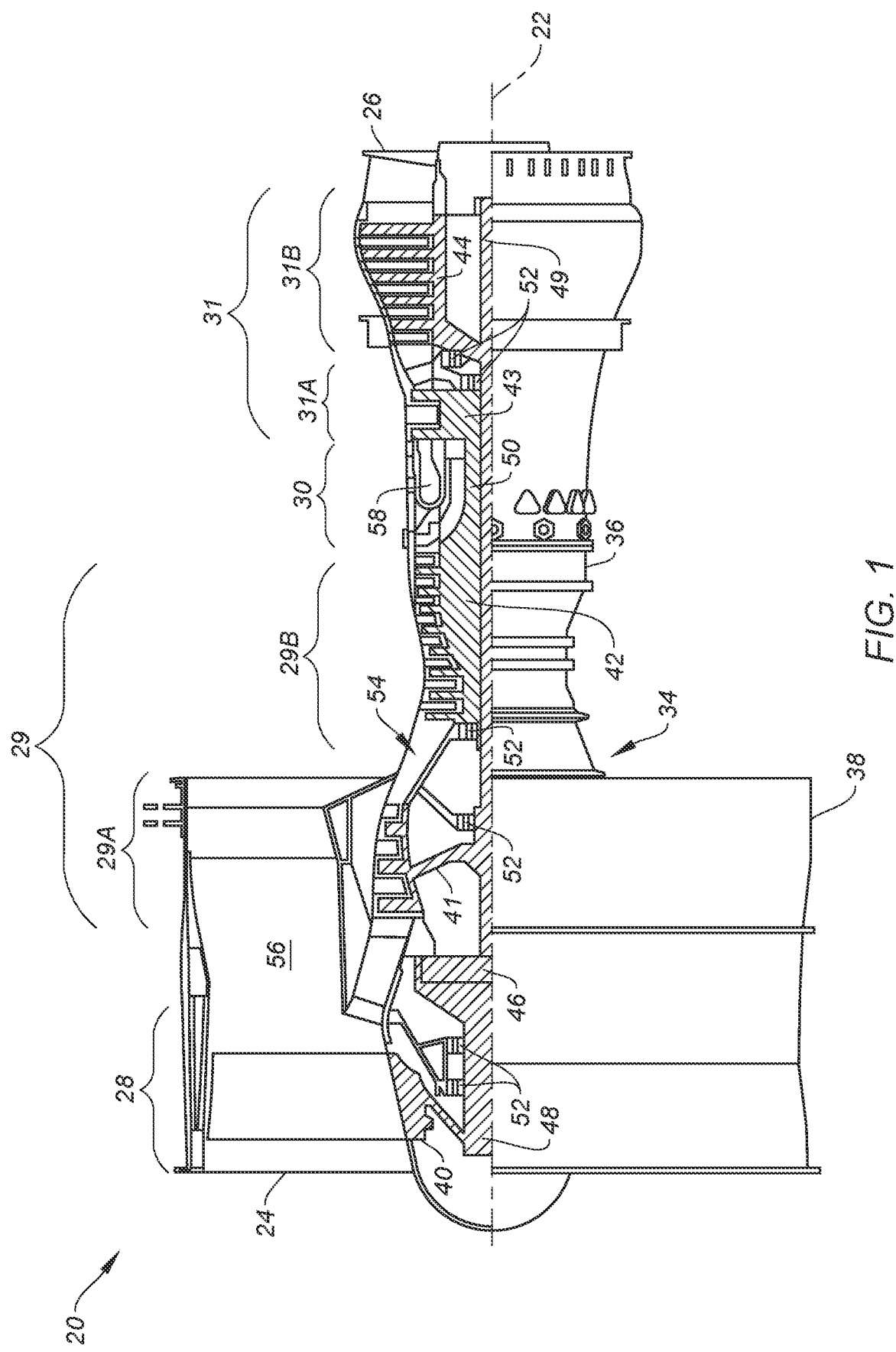
FIG. 1 is a side cutaway illustration of a geared gas turbine engine.

FIG. 1 is a side cutaway illustration of a geared gas turbine engine 20 for an aircraft propulsion system. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28-31B are arranged sequentially along the centerline 22 within an engine housing 34. This engine housing 34 includes an inner case 36 (e.g., a core case) and an outer case 38 (e.g., a fan case). The inner case 36 may house one or more of the engine sections 29A-31B; e.g., a core of the turbine engine 20. The outer case 38 may house at least the fan section 28.

Each of the engine sections 28, 29A, 29B, 31A and 31B includes a respective bladed engine rotor 40-44. Each of these engine rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The engine shafts 48-50 are rotatably supported by a plurality of bearings 52. Each of these bearings 52 is connected to the engine housing 34 by at least one stationary support structure such as, for example, an annular support strut.

During turbine engine operation, air enters the turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, which bypasses the engine core. The air within the bypass flowpath 56 may be referred to as "bypass air".

The core air is compressed by the LPC rotor 41 and the HPC rotor 42 and directed into a combustion chamber 58 of a combustor in the combustor section 30. Fuel is injected into the combustion chamber 58 and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40. The rotation of the fan rotor 40 propels the bypass air through and out of the bypass flowpath 56. The propulsion of the bypass air may account for a majority of thrust generated by the turbine engine 20, e.g., more than seventy-five percent (75%) of engine thrust. The turbine engine 20 of the present disclosure, however, is not limited to the foregoing exemplary thrust ratio.

A typical roller element bearing utilizes a plurality of roller elements engaged with an inner race and an outer race, where a lubricant film provides a buffer between the roller elements and the inner and the outer races. The engagement between the bearing elements and the inner and the outer races may subject the roller element bearing to relatively high heat loads. While these heat loads may be mitigated by increasing a flow of the lubricant to and through the roller element bearing, such an increase in the lubricant flow increases turbine engine lubrication demands overall. Therefore, in an effort to reduce lubrication and/or cooling demands on the turbine engine 20 as well as increase turbine engine efficiency (e.g., by reducing parasitic losses), any one or more of the bearings 52 may each be configured as a magnetic-foil bearing. The term "magnetic-foil bearing" may describe a bearing which utilizes a magnetic field and/or an air cushion to facilitate rotation of a bearing rotor within a bearing stator. With such a configuration, the bearing rotor may hover within a bore of the bearing stator with little or no contact between the bearing rotor and the bearing stator and without use of lubricant. In addition to reducing lubrication and/or cooling demands on the turbine engine 20 as well as increasing turbine engine efficiency, the magnetic-foil bearing may also improve dynamic properties such as damping.

Figure 2:
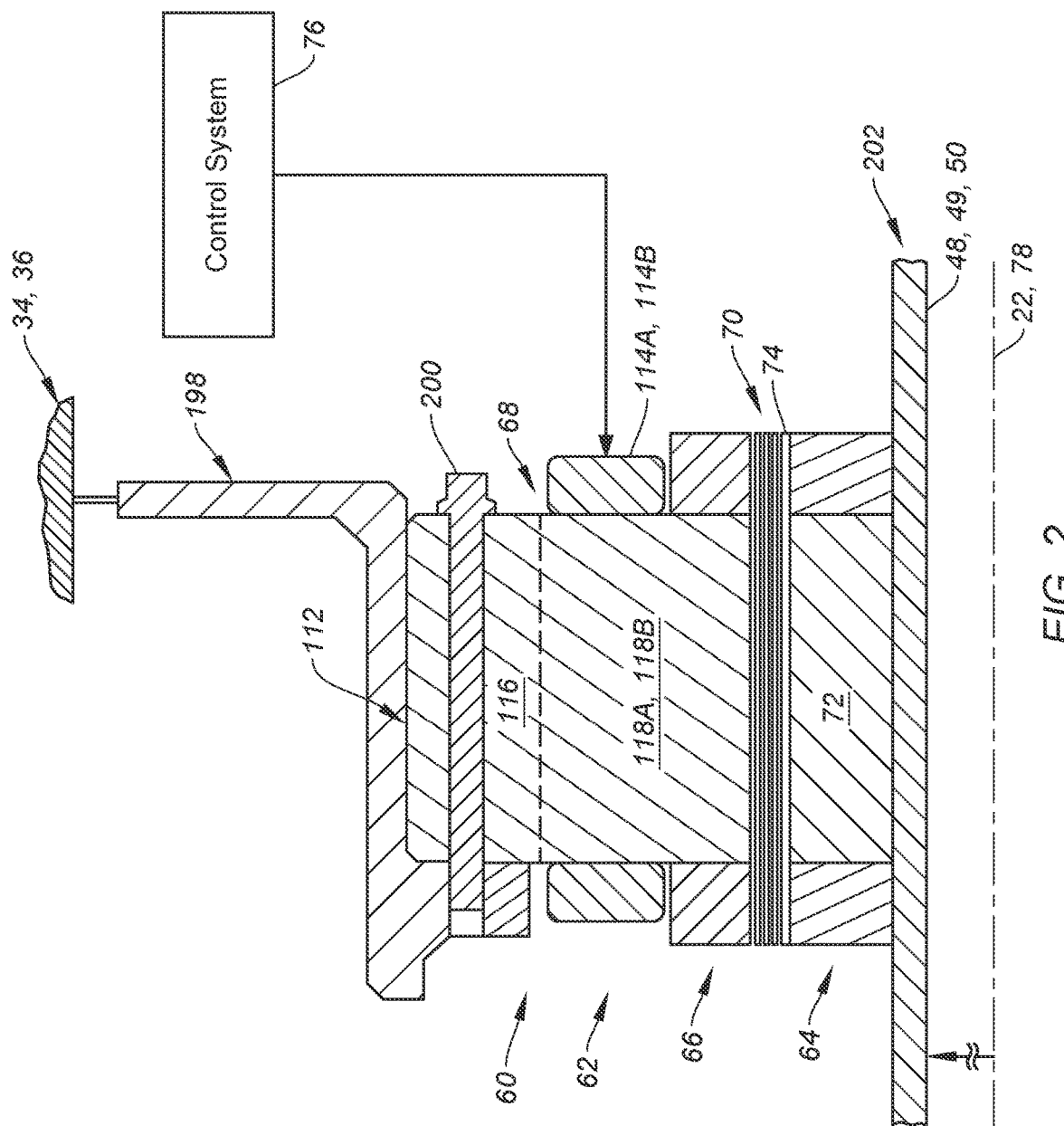
FIG. 2 is a partial side sectional illustration of a magnetic-foil bearing between a stationary structure and a rotating structure.

FIG. 2 illustrates an exemplary magnetic-foil bearing 60. This magnetic-foil bearing 60 is a combination of an active magnetic bearing (AMB) and a foil bearing (FB), which foil bearing may also be referred to as a foil-air bearing or a foil journal bearing. The magnetic-foil bearing 60 of FIG. 2, for example, includes a magnetic-foil bearing (MFB) stator 62 and a magnetic-foil bearing (MFB) rotor 64. The MFB stator 62 of FIG. 2 includes a magnetic-foil bearing (MFB) frame 66 (e.g., a retention structure), a magnetic bearing stator 68 and a foil bearing 70. The MFB rotor 64 of FIG. 2 includes a magnetic bearing rotor 72 and a rotor sleeve 74, where the magnetic bearing rotor 72 is in electromagnetic communication with the magnetic bearing stator 68 (e.g., through the foil bearing 70 and/or the rotor sleeve 74) as described below in further detail. The magnetic-foil bearing 60 also includes an active magnetic bearing (AMB) control system 76.

Figure 3:
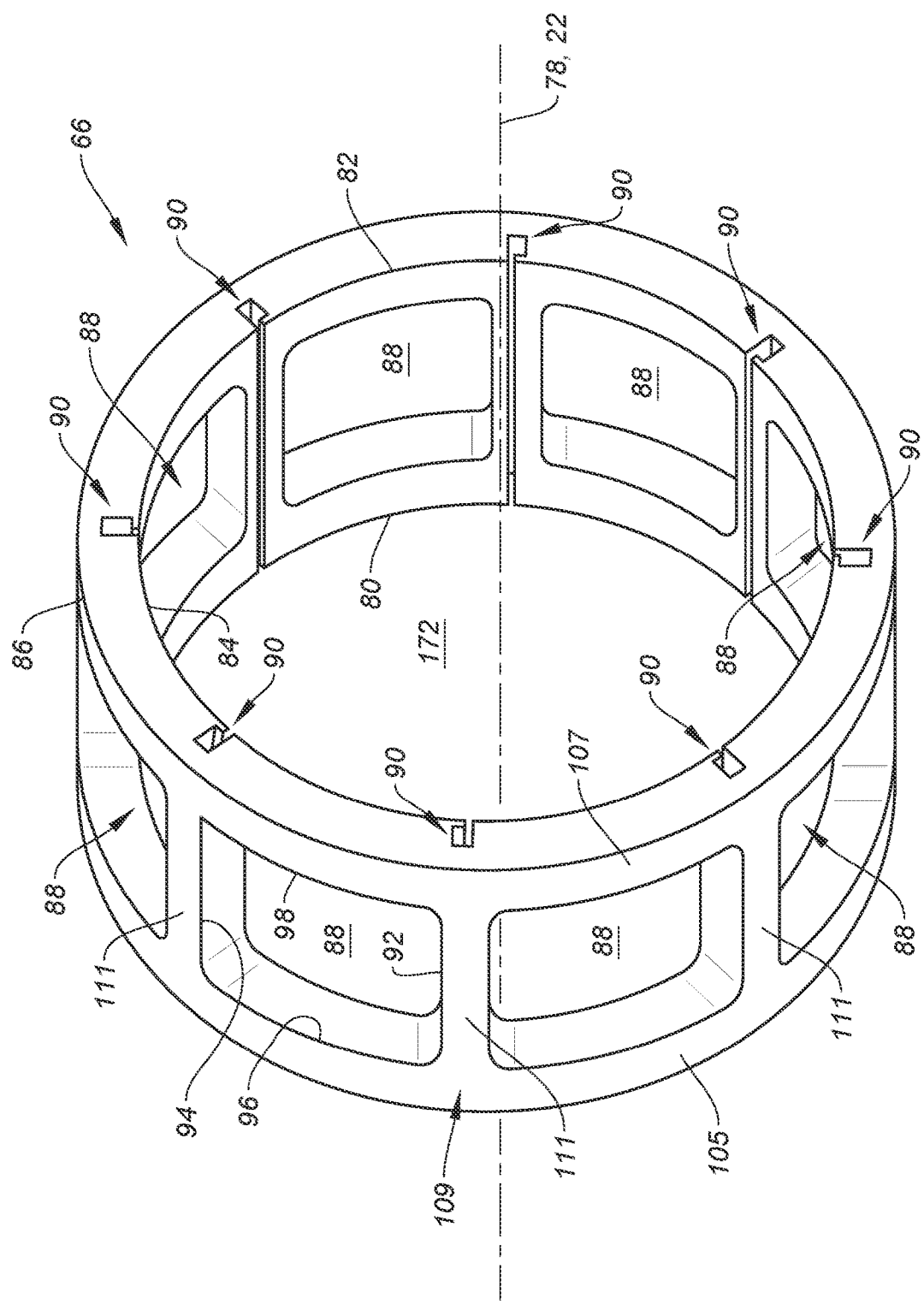
FIG. 3 is a perspective illustration of a frame for the magnetic-foil bearing.

Referring to FIG. 3, the MFB frame 66 extends axially along an axis 78 (e.g., the centerline 22) between and to a first end 80 of the MFB frame 66 and a second end 82 of the MFB frame 66. Briefly, the axis 78 may be a centerline axis of the MFB stator 62 and/or any one or more of its members 66, 68 and/or 70 (see FIG. 2). The axis 78 may also or alternatively be a centerline axis and/or a rotational axis of the MFB rotor 64 and/or any one or more of its members 72 and/or 74 (see FIG. 2). The MFB frame 66 extends radially between and to a radial inner side 84 of the MFB frame 66 and a radial outer side 86 of the MFB frame 66. The MFB frame 66 extends circumferentially about (e.g., completely around) the axis 78. The MFB frame 66 may thereby have a full-hoop tubular geometry.

The MFB frame 66 of FIG. 3 includes a plurality of stator channels 88 arranged circumferentially about the axis 78 in an array; e.g., a circular array. The MFB frame 66 of FIG. 3 also includes one or more retention slots 90 arranged circumferentially about the axis 78 in an array; e.g., a circular array. These retention slots 90 may be circumferentially interspersed with the stator channels 88. Each retention slot 90 of FIG. 3, for example, is disposed circumferentially between a respective circumferentially neighboring (e.g., adjacent) pair of the stator channels 88. Similarly, each stator channel 88 of FIG. 3 is disposed circumferentially between a respective circumferentially neighboring pair of the retention slots 90.

Each stator channel 88 extends radially through the MFB frame 66 between and to the frame inner side 84 and the frame outer side 86. Each stator channel 88 extends circumferentially about the axis 78 within the MFB frame 66 between circumferentially opposing sides 92 and 94 of the respective stator channel 88. Each stator channel 88 extends axially along the axis 78 within the MFB frame 66 between axially opposing sides 96 and 98 of the respective stator channel 88. Each of the axial channel sides 96, 98 extends circumferentially about the axis 78 between the circumferential channel sides 92, 94. Each of the circumferential channel sides 92, 94 extends axially along the axis 78 between the axial channel sides 96, 98. Each axial channel side 96, 98 may meet each respective circumferential channel side 92, 94 at a rounded interior corner; e.g., a fillet.

Figure 4:
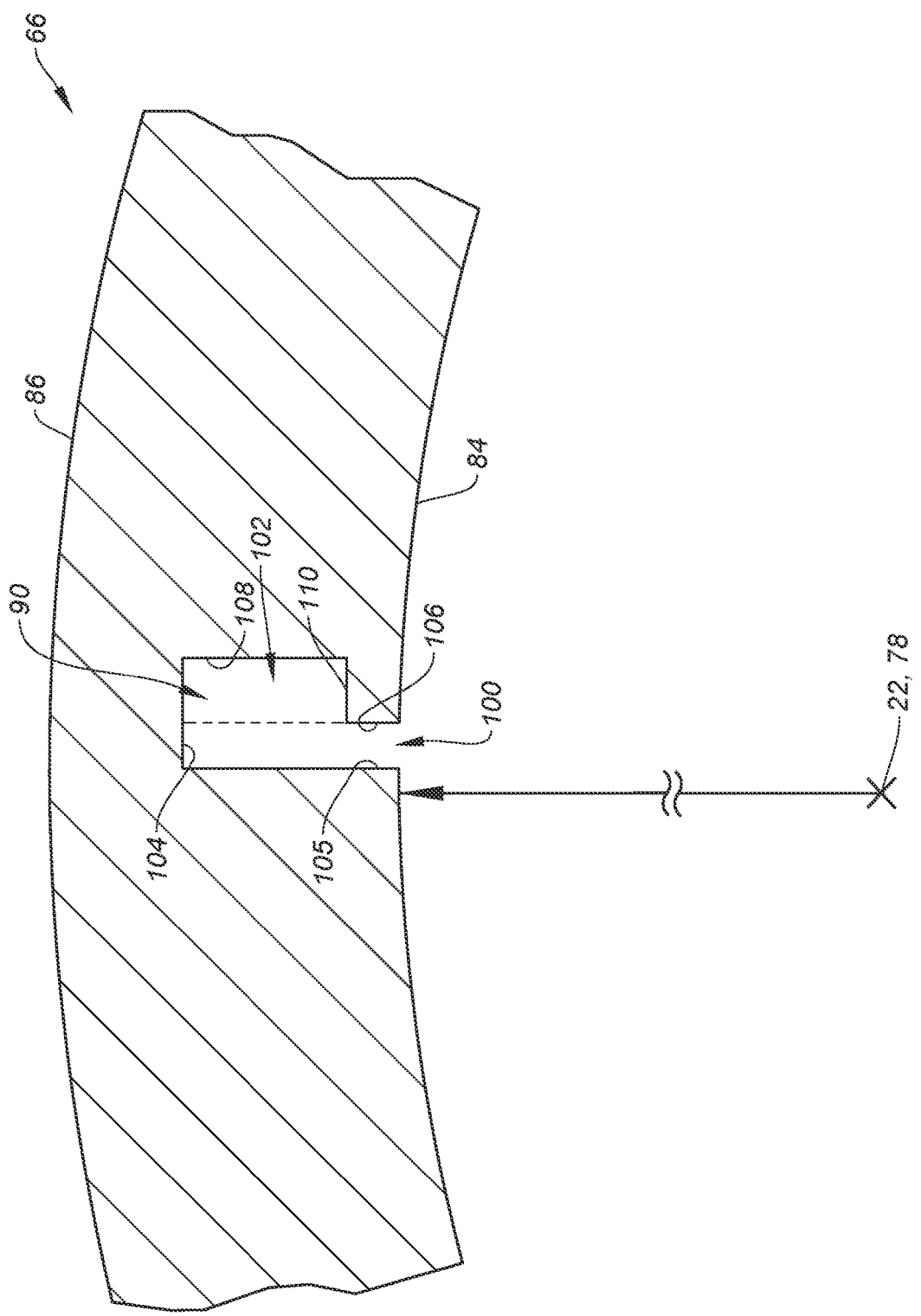
FIG. 4 is a partial cross-sectional illustration of the frame.

Each retention slot 90 extends axially through the MFB frame 66 between and to the frame first end 80 and the frame second end 82. Each retention slot 90 of FIG. 4 includes a groove 100 and a notch 102, where each of these slot members 100, 102 may extend axially through the MFB frame 66. The groove 100 projects radially into the MFB frame 66 (in a radial outward direction away from the axis 78) from the frame inner side 84 to a radial outer distal end 104 of the respective retention slot 90. The groove 100 extends laterally (e.g., circumferentially or tangentially) within the MFB frame 66 from a lateral first side 105 of the respective retention slot 90 to a lateral second side 106 of the groove 100. The notch 102 is disposed at (e.g., on, adjacent or proximate) the slot distal end 104. This notch 102 projects laterally out from the groove 100 and its groove second side 106 into the MFB frame 66 to a second side 108 of the respective retention slot 90. The notch 102 extends radially within the MFB frame 66 between and to the slot distal end 104 (e.g., a radial outer side of the notch 102) and a radial inner side 110 of the notch 102. With this configuration, the retention slot 90 of FIG. 4 has an L-shaped sectional geometry when viewed, for example, in a reference plane perpendicular to the axis 78. The present disclosure, however, is not limited to such an exemplary retention slot configuration. For example, in other embodiments, one or more of the retention slots 90 may each have a T-shaped sectional geometry (e.g., a geometry with double opposing notches) or a I-shaped sectional geometry (e.g., a geometry without a notch).

With the foregoing arrangement, the MFB frame 66 of FIG. 3 includes an annular first end portion 105, an annular second end portion 107 and an intermediation portion 109 extending axially between and connected to (e.g., formed integral with) the first end portion 105 and the second end portion 107. The first end portion 105 extends axially between and forms the frame first end 80 and the first axial channel side 96. The second end portion 107 extends axially between and forms the frame second end 82 and the second axial channel side 98. The intermediate portion 109 of FIG. 3 is formed by a plurality of beams 111 arranged circumferentially about the axis 78 in an array; e.g., a circular array. Each of these beams 111 extends circumferentially between and forms a respective set of the circumferential channel sides 92 and 94 of a respective circumferentially neighboring pair of the respective stator channel 88. Each of these beams 111 also includes a respective one of the retention slots 90.

The MFB frame 66 may be constructed as a monolithic body from frame material. The MFB frame 66, for example, may be cast, machined, additively manufactured and/or otherwise formed as a single, unitary body. The frame material may be a metal such as, but not limited to, Inconel 718, 304 stainless steel, 400 series steel, silicon steel, titanium 6AL-4V and 316 stainless steel. Additionally or in the alternative, the frame material may be a composite material, such as carbon fiber, fiberglass, or the like, a plastic material, and/or a combination of the foregoing and/or a metal material. The present disclosure, however, is not limited to such an exemplary frame construction nor frame materials.

Figure 5:
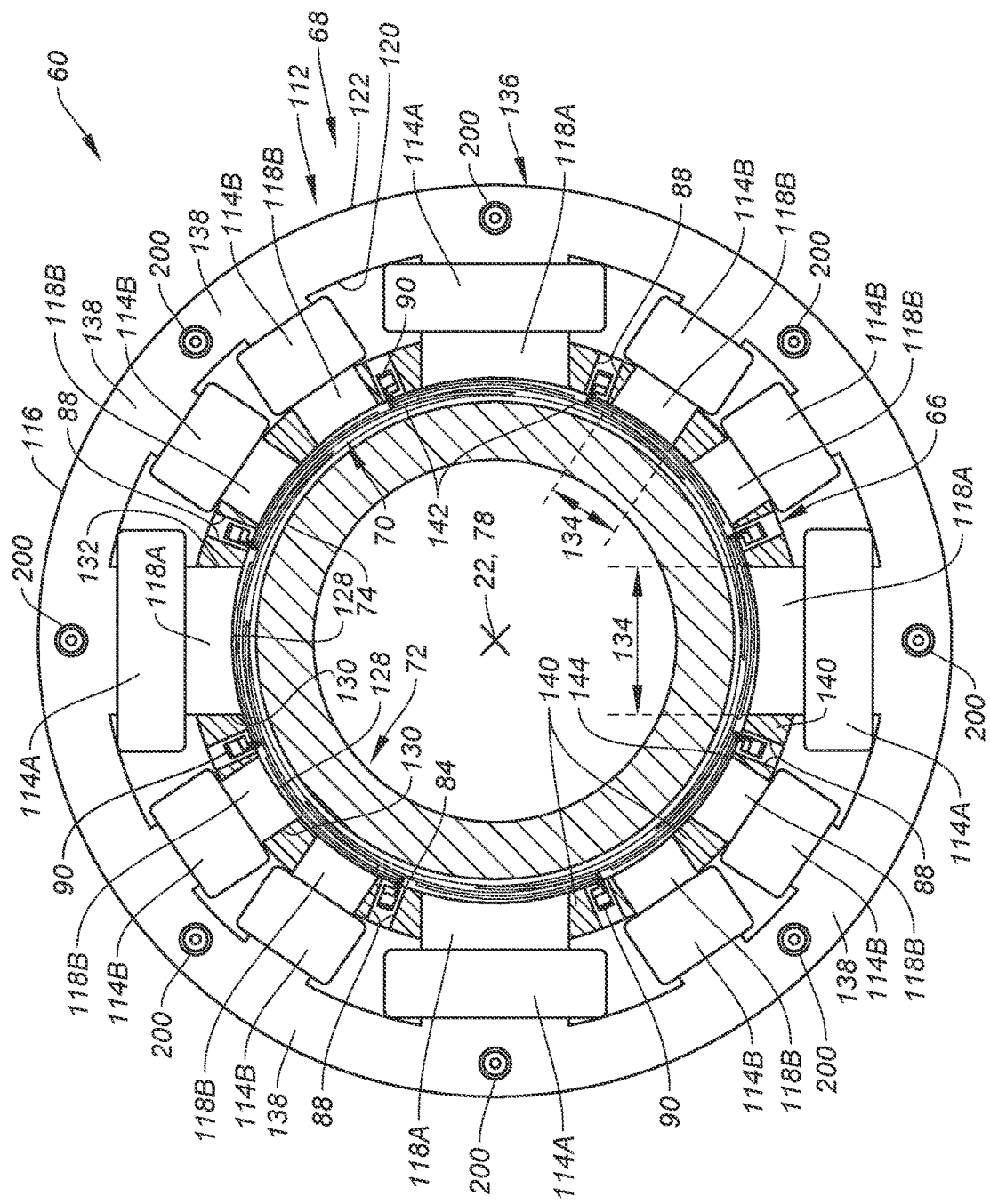
FIG. 5 is a cutaway illustration of the magnetic-foil bearing.

Referring to FIG. 5, the bearing stator 68 includes a stator body 112 and a plurality of electrical windings 114A and 114B (generally referred to as "114"); e.g., copper wire windings. The stator body 112 of FIG. 5 includes a stator body base 116 ("stator base") and a plurality of stator body protrusions 118A and 118B (generally referred to as "118") ("stator protrusions"); e.g., inward facing teeth.

Figure 6:
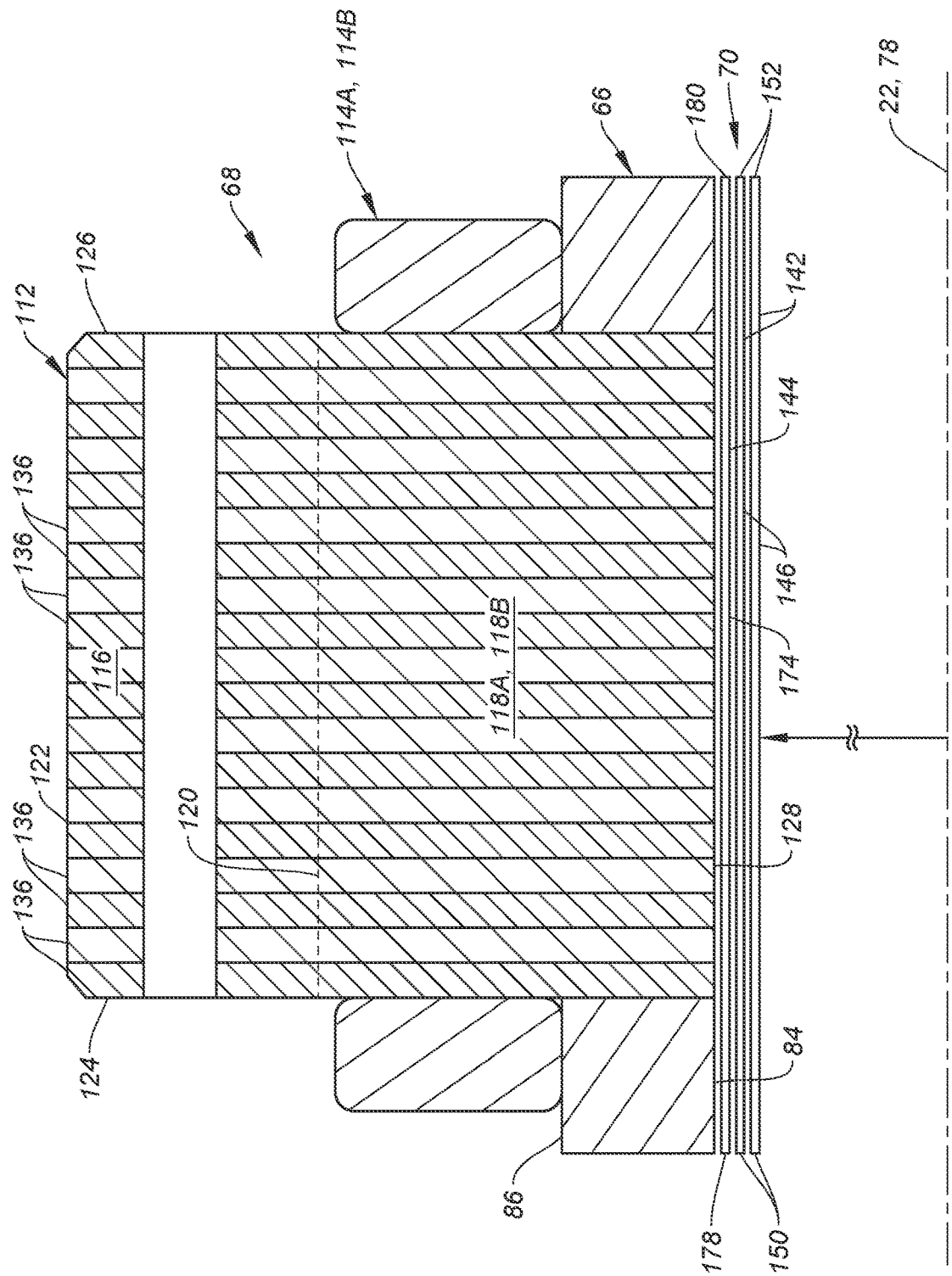
FIG. 6 is a partial side sectional illustration of a stator of the magnetic-foil bearing.

The stator base 116 extends circumferentially about (e.g., completely around) the axis 78. The stator base 116 and, more generally, the stator body 112 may thereby have a full-hoop tubular geometry. The stator base 116 extends radially between and to a radial inner side 120 of the stator base 116 and a radial outer side 122 of the bearing stator 68 and its stator body 112. Referring to FIG. 6, the stator base 116 extends axially along the axis 78 between and to a first end 124 of the stator body 112 and a second end 126 of the stator body 112.

Referring to FIG. 5, the stator protrusions 118A and 118B are collectively arranged circumferentially about the axis 78 in an array; e.g., a circular array. More particularly, the stator protrusions 118A of FIG. 5 are arranged circumferentially about the axis 78 in a first array. The stator protrusions 118B are arranged circumferentially about the axis 78 in a second array. The stator protrusions 118B are interspersed with stator protrusions 118A. Each stator protrusion 118A of FIG. 5, for example, is disposed circumferentially between a respective circumferentially neighboring pair of the stator protrusions 118B. Similarly, each set of two (or more) stator protrusions 118B is disposed (e.g., side-by-side) circumferentially between a respective circumferentially neighboring pair of the stator protrusions 118A. However, various other patterns of stator protrusions 118A and 118B about the axis 78 are possible. Furthermore, it is contemplated the stator body 112 may be configured without the stator protrusions 118A or the stator protrusions 118B in still other embodiments where, for example, all of the stator protrusions 118 have a common configuration.

Each stator protrusion 118 is connected to (e.g., formed integral with) the stator base 116 at its base inner side 120. Each stator protrusion 118 projects radially out from the stator base 116 (in a radial inward direction towards the axis 78) to a radial inner distal end 128 of the respective stator protrusion 118. This protrusion distal end 128 is located at a radial inner side of the bearing stator 68 and its stator body 112, and may have an arcuate geometry. Each stator protrusion 118 extends laterally between laterally opposing sides 130 and 132 of the respective stator protrusion 118, which defines a lateral width 134 of that stator protrusion 118. This lateral width 134 may be uniform (e.g., constant) along a radial length of the respective stator protrusion 118. The stator protrusions 118A may be configured with common (the same) lateral widths 134. Similarly, the stator protrusions 118B may be configured with common (the same) lateral widths 134. However, the lateral width 134 of each stator protrusion 118A is different (e.g., greater) than the lateral width 134 of each stator protrusion 118B. Referring to FIG. 6, each stator protrusion 118 extends axially along the axis 78 between and to the body first end 124 and the body second end 126.

The stator body 112 may be configured as or otherwise include a stator lamination. The stator body 112 of FIG. 6, for example, is formed from a plurality of stator body layers 136 (e.g., plates, etc.) arranged side-by-side along the axis 78 in a stack. Each of these stator body layers 136 (e.g., completely) forms a corresponding axial section of the stator body 112. Each stator body layer 136, for example, may form a respective axial section of the stator base 116 and a respective axial section of each stator protrusion 118. Referring to FIG. 5, each stator body layer 136 may include one or more circumferential segments 138, where these circumferential segments 138 are arranged circumferentially about the axis 78 to provide the respective stator body layer 136 with an annular geometry. However, it is contemplated each stator body layer 136 may alternatively be circumferentially unsegmented. Each of the stator body layers 136 may be formed from a ferromagnetic material such as, but not limited to, SiFe (silicon steel, electrical steel, etc.), HiperCo 50, tungsten steel, carbon steel, cobalt, magnetite and nickel. The present disclosure, however, is not limited to such an exemplary laminated configuration nor stator body materials.

Referring to FIG. 5, the stator windings 114 are arranged circumferentially about the axis 78 in an array; e.g., a circular array. Each of the stator windings 114A, 114B is configured with a respective one of the stator protrusions 118A, 118B. Each of the stator windings 114A, 114B of FIG. 5, for example, is wrapped around the respective stator protrusion 118A, 118B, for example radially at the base inner side 120. With this arrangement, the stator windings 114 are spaced radially outward from the stator inner side and the distal ends 128, and the stator base 116 circumscribes the array of the stator windings 114. Each of the stator windings 114A, 114B may also be bonded and/or otherwise attached to the respective stator protrusion 118A, 118B.

The bearing stator 68 is mated with and held together by the MFB frame 66. Each of the stator protrusions 118A is received by a respective one of the stator channels 88. More particularly, each stator protrusion 118A projects radially into (e.g., and through) the respective stator channel 88. Each respective set of the stator protrusions 118B is received by a respective one of the stator channels 88. More particularly, each stator protrusion 118B in each respective set projects radially into (e.g., and through) the respective stator channel 88, which facilitates setting a distance between each stator protrusion 118B and the magnetic bearing rotor 72. Furthermore, each of the stator protrusions 118 is attached to the MFB frame 66. Potting material 140, for example, may be disposed in each stator channel 88 about the respective stator protrusion(s) 118 to attach the respective stator protrusion(s) 118 to the MFB frame 66. This potting material 140 may mechanically retain the respective stator protrusion(s) 118 within the respective stator channel 88 and/or bond the respective stator protrusion(s) 118 to the MFB frame 66. Of course, various other techniques may also or alternatively be used to attach the stator protrusions 118 to the MFB frame 66.

When the bearing stator 68 is mated with the MFB frame 66, the body inner side may be radially aligned with the frame inner side 84. Thus, the protrusion distal ends 128 may be radially inline with the frame inner side 84. The stator base 116 is disposed radially outboard of the MFB frame 66. The stator body 112 and its stator base 116 may thereby circumscribe the MFB frame 66. Furthermore, each of the windings 114 is arranged radially outboard of the MFB frame 66, radially between the MFB frame 66 and the stator base 116.

The foil bearing 70 includes one or more top foils 142 and one or more bump foils 144; however, it is contemplated the foil bearing 70 may also include one or more intermediate foils between the top foils 142 and the bump foils 144. The set of top foils 142 and the set of bump foils 144 are each respectively arranged about the axis 78 in an array; e.g., a circular array. Each top foil 142 is also paired with a respective one of the bump foils 144 as described below in further detail.

Figure 7:
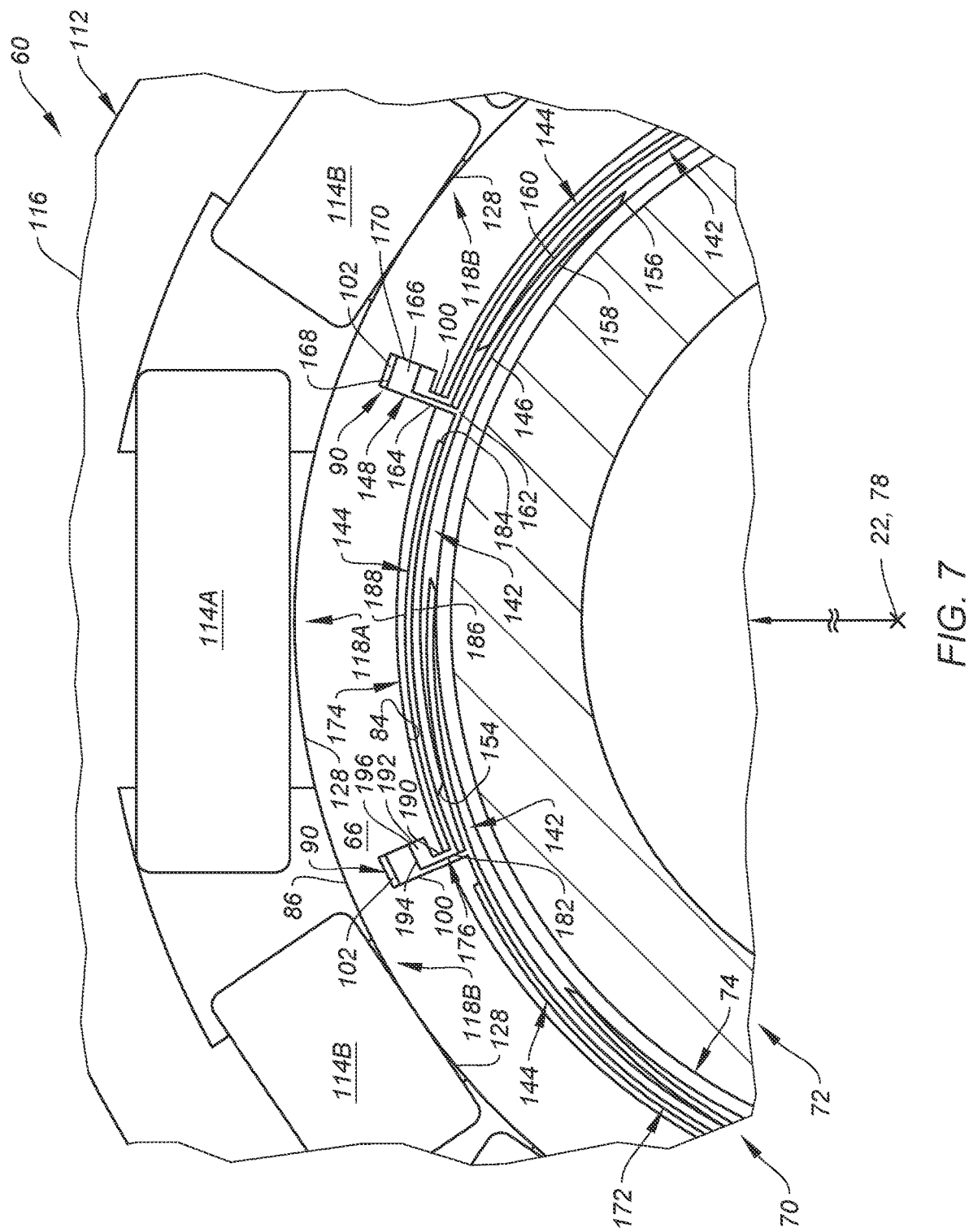
FIG. 7 is a partial cross-sectional illustration of the magnetic-foil bearing.

Each top foil 142 of FIG. 7 includes an arcuate top foil base 146 ("top base") and a top foil mount 148 ("top mount"). Referring to FIG. 6, each top foil 142 and its members 146 and 148 extends axially along the axis 78 between and to a first end 150 of the respective top foil 142 and a second end 152 of the respective top foil 142. Referring again to FIG. 7, the top base 146 extends circumferentially about the axis 78 between and to a first side 154 of the respective top foil 142 and a second side 156 of the respective top foil 142. The top base 146 extends radially between and to a radial inner side 158 of the respective top foil 142 and its top base 146 and a radial outer side 160 of the top base 146.

The top mount 148 is connected to (e.g., formed integral with) the top base 146 at a connection point 162. This connection point 162 may be disposed at a circumferential intermediate position between the opposing top foil sides 154 and 156. However, the connection point 162 may be closer circumferentially to the top foil second side 156 than the top foil first side 154. For example, the connection point 162 may be located between fifty percent (50%) and eighty percent (80%) of a circumferential length of the top foil 142 as measured from the top foil first side 154 to the top foil second side 156. The present disclosure, however, is not limited to such an exemplary arrangement.

The top mount 148 of FIG. 7 includes a top mount flange 164 ("top flange") and a top mount rim 166 ("top rim"). The top flange 164 projects radially out from the top base 146 (at the connection point 162) to a radial outer distal end 168 of the top mount 148 and its top flange 164. The top rim 166 is disposed at the top mount distal end 168. This top rim 166 projects laterally out from the top flange 164 to a lateral distal end 170 of the top rim 166. With this configuration, the top mount 148 of FIG. 7 has an L-shaped sectional geometry when viewed, for example, in a reference plane perpendicular to the axis 78. The present disclosure, however, is not limited to such an exemplary top mount configuration. For example, in other embodiments, the top mount 148 may have a T-shaped sectional geometry (e.g., a geometry with opposing double top rims) or a I-shaped sectional geometry (e.g., a geometry without a top rim).

Each top foil 142 is retained within an inner bore 172 of the MFB frame 66. More particularly, the top base 146 is disposed within the inner bore 172 and the top mount 148 is mated with a respective one of the retention slots 90. The top mount 148 and its top flange 164 project radially (in the radial outward direction) into the respective retention slot 90 and its groove 100. The top rim 166 projects laterally into the notch 102. The top mount 148 and its top rim 166 are thereby captured radially within the respective retention slot 90 and attached to the MFB frame 66.

When attached to the MFB frame 66, each top foil 142 may circumferentially overlap one or more of the other top foils 142. A first portion of each top base 146 at its first side 154 of FIG. 7, for example, is disposed radially between the MFB frame 66 and a second portion of a circumferentially adjacent top base 146 at its second side 156. Similarly, the second portion of each top base 146 at its second side 156 is disposed radially between the MFB frame 66 and the first portion of another circumferentially adjacent top base 146 at its first side 154. The top foils 142 may thereby be shingled circumferentially about the axis 78.

Each bump foil 144 of FIG. 7 includes an arcuate bump foil base 174 ("bump base") and a bump foil mount 176 ("bump mount"). Referring to FIG. 6, each bump foil 144 and its members 174 and 176 extends axially along the axis 78 between and to a first end 178 of the respective bump foil 144 and a second end 180 of the respective bump foil 144. Referring to again FIG. 7, the bump base 174 extends circumferentially about the axis 78 between and to a first side 182 of the respective bump foil 144 and a second side 184 of the respective bump foil 144. The bump base 174 extends radially between and to a radial inner side 186 of the respective bump foil 144 and its bump base 174 and a radial outer side 188 of the bump base 174.

The bump mount 176 is connected to (e.g., formed integral with) the bump base 174 at the bump foil first end 182. The bump mount 176 of FIG. 7 includes a bump mount flange 190 ("bump flange") and a bump mount rim 192 ("bump rim"). The bump flange 190 projects radially out from the bump base 174 (at the bump foil first side 182) to a radial outer distal end 194 of the bump mount 176 and its bump flange 190. The bump rim 192 is disposed at the bump mount distal end 194. This bump rim 192 projects laterally out from the bump flange 190 to a lateral distal end 196 of the bump rim 192. With this configuration, the bump mount 176 of FIG. 7 has an L-shaped sectional geometry when viewed, for example, in a reference plane perpendicular to the axis 78. The present disclosure, however, is not limited to such an exemplary bump mount configuration. For example, in other embodiments, the bump mount 176 may have a T-shaped sectional geometry (e.g., a geometry with opposing double bump rims) or a I-shaped sectional geometry (e.g., a geometry without a bump rim).

Each bump foil 144 is retained within the inner bore 172 of the MFB frame 66. More particularly, the bump base 174 is disposed within the inner bore 172 and the bump mount 176 is mated with a respective one of the retention slots 90. The bump mount 176 and its bump flange 190 project radially (in the radial outward direction) into the respective retention slot 90 and its groove 100. The bump rim 192 projects laterally into the notch 102. The bump mount 176 and its bump rim 192 are thereby captured radially within the respective retention slot 90 and attached to the MFB frame 66. In the arrangement of FIG. 7, the bump mount 176 and its bump flange 190 are disposed circumferentially between (a) the top mounts 148 and its top flange 164 and (b) the lateral second side 106 of the groove 100 (see FIG. 4). The bump mount 176 and its bump rim 192 are also disposed radially between (a) the top mount 148 and its top rim 166 and (b) the radial inner side 110 of the notch 102 (see FIG. 4).

When attached to the MFB frame 66, each bump foil 144 is configured to bias one or more of the top foils 142 radially inward away from the MFB frame 66 and its frame inner side 84. Each bump foil 144, for example, is configured as a cantilevered leaf spring that pushes in the radial inward direction against the radial outer side 160 of a respective top base 146. In the arrangement of FIG. 7, the bump base 174 is disposed radially between the MFB frame 66 and a circumferentially overlapping set of the top foils 142 and their top bases 146.

Referring to FIG. 5, when the MFB stator 62 is assembled, the MFB frame 66 is axially aligned with (e.g., extends axially along, axially overlaps, etc.) and circumscribes the foil bearing 70 and its foils 142 and 144. Similarly, the bearing stator 68 and its stator body 112 are axially aligned with and circumscribe the foil bearing 70 and its foils 142 and 144. The bearing stator 68 and the foil bearing 70 are thereby radially stacked using the MFB frame 66. Moreover, the MFB frame 66 may facilitate securing the foil bearing 70 to the bearing stator 68 without requiring modification of the bearing stator 68 and, more particularly, the stator protrusions 118. This radial stacking of the bearing stator 68 with the foil bearing 70 may also reduce an axial footprint/overall volume of the magnetic-foil bearing 60; e.g., compared to if the bearing stator 68 and the foil bearing 70 were arranged axially side-by-side or otherwise arranged. In addition, the foil bearing 70 and its foils 142 and 144 may be mounted without bedding the foils 142 and/or 144 in the potting material about the stator body 112 and its stator protrusion 118.

Referring to FIG. 2, the MFB stator 62 is fixed to engine housing 34. The MFB stator 62 of FIG. 2, for example, is secured (e.g., mechanically fastened) to a bearing carrier 198 (e.g., a housing structure or housing member). The bearing carrier 198 is secured (e.g., mechanically fastened) to the inner case 36 through a support structure, where at least this support structure, the bearing carrier 198 and the inner case 36 may collectively form a stationary structure of the turbine engine 20. To secure the MFB stator 62 to the bearing carrier 198, the bearing stator 68 and its stator base 116 are mechanically fastened to the bearing carrier 198 by one or more fasteners 200; e.g., bolts. Each of these fasteners 200 projects axially through the stator base 116 (and its layers 136 of FIG. 6) and is threaded into a respective fastener aperture in the bearing carrier 198. With the foregoing arrangement, the MFB stator 62 and its various members may be installed and removed as a single unit without, for example, disturbing the potting material.

The bearing rotor 72 may be configured as a rotor lamination; e.g., similar to the stator lamination of FIG. 6. This bearing rotor 72 is mounted to a rotating structure 202 of the turbine engine 20, which rotating structure 202 may include one or more of the engine shafts 48, 49, 50 of FIG. 1. The bearing rotor 72 of FIG. 2, for example, circumscribes and is attached to the rotating structure 202 such that the bearing rotor 72 is rotatable with the rotating structure 202. Similarly, the rotor sleeve 74 is mounted to the rotating structure 202 and/or the bearing rotor 72. The rotor sleeve 74 of FIG. 2, for example, circumscribes the bearing rotor 72 and is attached to the bearing rotor 72 and/or the rotating structure 202 such that the rotor sleeve 74 is also rotatable with the rotating structure 202. The MFB rotor 64 is also mated with the MFB stator 62. More particularly, the MFB rotor 64 and its members 72 and 74 are disposed within an inner bore of the MFB stator 62 and its foil bearing 70. The MFB stator 62 and each of its members 66, 68 and 70 are thereby axially aligned with and circumscribe the MFB rotor 64 and each of its members 72 and 74.

Figure 8:
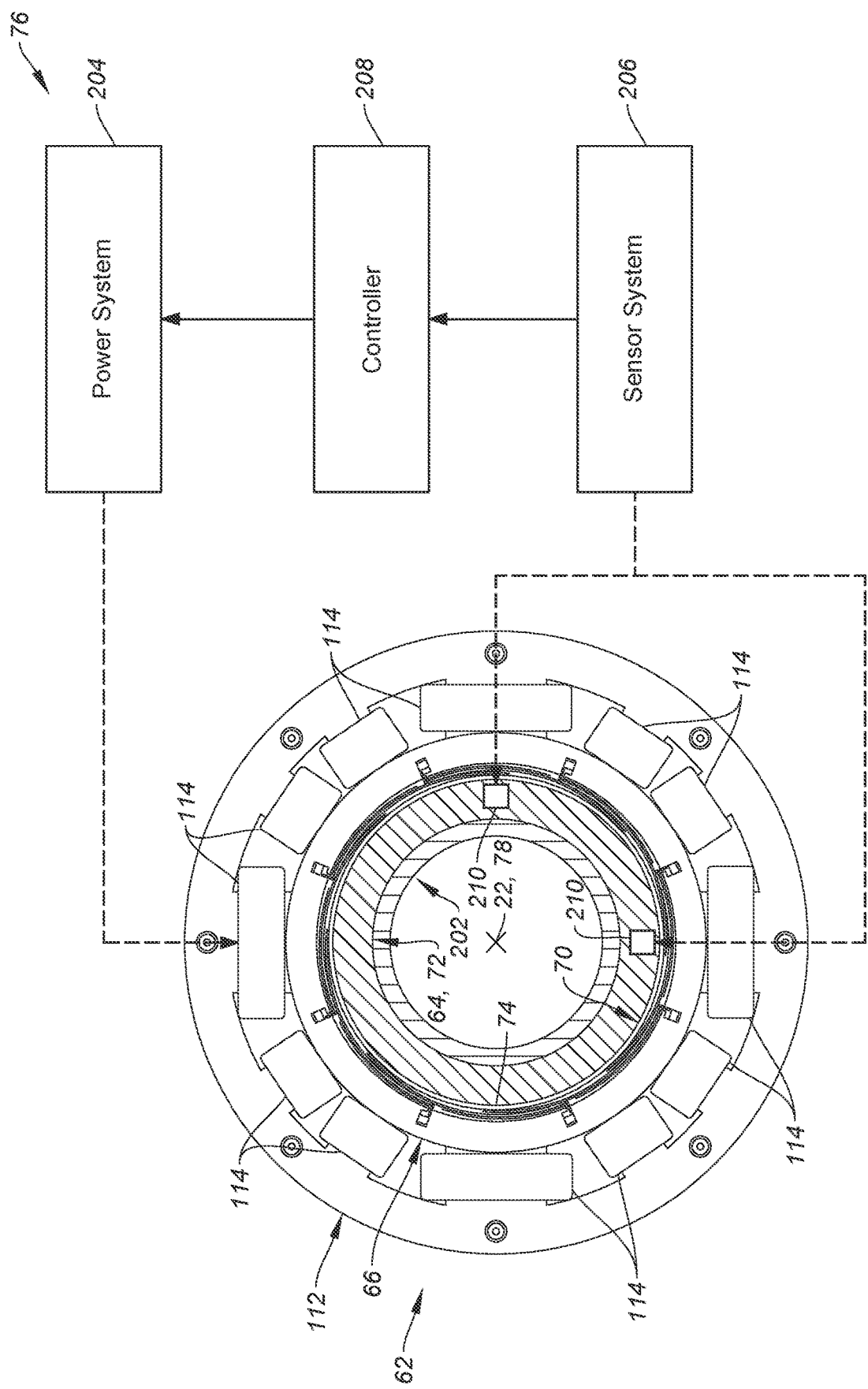
FIG. 8 is a schematic, cross-sectional illustration of the magnetic-foil bearing with the rotating structure and a control system.

Referring to FIG. 8, the control system 76 includes a power system 204, a sensor system 206 and a controller 208 in signal communication (e.g., hardwired and/or wirelessly coupled to) the power system 204 and the sensor system 206. The power system 204 is electrically coupled to the MFB stator 62 and each of its windings 114. This power system 204 is configured to supply electricity to the MFB stator 62 and each of its windings 114 for operation. The sensor system 206 includes one or more sensors 210 (e.g., proximity sensors) arranged with the MFB rotor 64. The sensor system 206 is configured to determine a radial position of the MFB rotor 64 relative to the MFB stator 62. The controller 208 is configured to signal the power system 204 to selectively energize the windings 114 in order to maintain the MFB rotor 64 coaxial with the MFB stator 62 based on sensor feedback provided by the sensor system 206.

The active magnetic bearing and foil bearing functionalities of the magnetic-foil bearing 60 may complement one another during turbine engine operation. For example, as the rotating structure 202 initially begins to rotate, stops or otherwise rotates relatively slowly (e.g., during windmilling, etc.), the foil bearing 70 may provide support for the MFB rotor 64 within the MFB stator 62. During high speed operation, a magnetic field generated by the bearing stator 68 may support rotation of the MFB rotor 64 within the MFB stator 62. However, load capacity of the magnetic field may be strengthened by also providing an air cushion between the rotor sleeve 74 and the foil bearing 70. This air cushion is generated by the rotation of the rotor sleeve 74 within the foil bearing 70. The magnetic-foil bearing 60 of the present disclosure thereby provides a high load capacity, relatively low friction bearing; e.g., which may utilize no lubricant at the interface between the MFB stator 62 and the MFB rotor 64. The foil bearing 70 also provides a backup to the active magnetic bearing functionality.

The magnetic-foil bearing(s) 60 may be included in various turbine engines other than the one described above as well as in other types of rotational equipment. The magnetic-foil bearing(s) 60, for example, may be included in a geared turbine engine where a geartrain connects one or more shafts to one or more rotors in a fan section, a compressor section and/or any other engine section. Alternatively, the magnetic-foil bearing(s) 60 may be included in a turbine engine configured without a geartrain; e.g., a direct drive turbine engine. The magnetic-foil bearing(s) 60 may be included in a geared or non-geared turbine engine configured with a single spool, with two spools (e.g., see FIG. 1), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines. Moreover, the magnetic-foil bearing(s) 60 may be utilized in various types of rotational equipment other than turbine engines. The magnetic-foil bearing(s) 60, for example, may be utilized in automotive or other land-based vehicle applications within an engine and/or a drivetrain.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A bearing assembly, comprising:
   a frame extending axially along and circumferentially about an axis, the frame including an inner bore and a plurality of channels arranged circumferentially about the axis;
   a magnetic bearing stator including a stator body and a plurality of windings, the stator body circumscribing the frame, the stator body comprising a plurality of stator protrusions arranged circumferentially about the axis, each of the plurality of stator protrusions projecting radially inward into a respective one of the plurality of channels, and each of the plurality of windings wrapped around a respective one of the plurality of stator protrusions; and
   a foil bearing disposed within the inner bore and retained to the frame, the foil bearing including a top foil and a bump foil, the top foil retained to the frame, the top foil including an arcuate base and a mount, the arcuate base disposed within the inner bore and extending circumferentially about the axis between opposing ends, the mount projecting radially out from the arcuate base into a retention slot in the frame and disposed at a circumferential intermediate position between the opposing sides, and the bump foil retained to the frame and disposed radially between the top foil and the frame.

2. The bearing assembly of claim 1, wherein each of the plurality of channels extends radially through the frame.

3. The bearing assembly of claim 1, wherein a first of the plurality of stator protrusions is attached to the frame.

4. The bearing assembly of claim 1, wherein a first of the plurality of stator protrusions is secured within a first of the plurality of channels with potting material.

5. The bearing assembly of claim 1, wherein the stator body comprises a stator lamination.

6. The bearing assembly of claim 1, wherein
   a first of the plurality of stator protrusions has a first lateral width; and
   a second of the plurality of stator protrusions has a second lateral width that is different than the first lateral width.

7. The bearing assembly of claim 1, wherein
   a first of the plurality of stator protrusions has a first lateral width; and
   a second of the plurality of stator protrusions has a second lateral width that is equal to the first lateral width.

8. The bearing assembly of claim 1, wherein a first of the plurality of windings is arranged radially outboard of the frame.

9. The bearing assembly of claim 1, wherein the magnetic bearing stator is axially aligned with and circumscribes the foil bearing.

10. The bearing assembly of claim 1, wherein the bump foil is configured to bias the top foil radially inward away from the frame.

11. The bearing assembly of claim 1, wherein the mount includes a flange projecting radially out from the arcuate base into the retention slot; and
a rim projecting laterally into a notch of the retention slot.

12. The bearing assembly of claim 1, wherein the bump foil includes
an arcuate base disposed within the inner bore; and
a mount projecting radially out from the arcuate base into a retention slot in the frame.

13. The bearing assembly of claim 12, wherein the mount includes
a flange projecting radially out from the arcuate base into the retention slot; and
a rim projecting laterally into a notch of the retention slot.

14. The bearing assembly of claim 1, wherein
the top foil is a first top foil, and the foil bearing further includes a second top foil and a third top foil;
the second top foil is arranged circumferentially between the first top foil and the third top foil, and the second top foil is disposed radially between the first top foil and the frame; and
the third top foil is disposed radially between the second top foil and the frame.

15. The bearing assembly of claim 1, further comprising:
a rotating structure comprising a magnetic bearing rotor;
the rotating structure configured to rotate about the axis; and
the foil bearing circumscribing and axially aligned with the magnetic bearing rotor.

16. A bearing assembly, comprising:
a frame extending axially along and circumferentially about an axis, the frame including an inner bore and a retention slot projecting radially into the frame from the inner bore;
a magnetic bearing stator including a stator body and a plurality of windings wrapped around the stator body, the magnetic bearing stator circumscribing the frame; and
a foil bearing including a top foil and a bump foil;
the top foil including an arcuate top foil base and a top foil mount, the arcuate top foil base disposed within the inner bore, the arcuate top foil base extending circumferentially about the axis between opposing sides, and the top foil mount connected to the arcuate top foil base at a connection point and projecting radially into the retention slot, and the connection point is disposed between the opposing sides of the arcuate top foil base; and
the bump foil including an arcuate bump foil base and a bump foil mount, the arcuate bump foil base disposed within the inner bore radially between the arcuate top foil base and the frame, and the bump foil mount connected to the arcuate bump foil base and projecting radially into the retention slot.

17. A bearing assembly, comprising:
a magnetic bearing stator including a stator body and a plurality of windings, the stator body extending axially along and circumferentially about an axis, the stator body comprising a plurality of stator protrusions arranged circumferentially about the axis, each of the plurality of stator protrusions projecting radially inward towards the axis to a respective distal end, and each of the plurality of windings wrapped around a respective one of the plurality of stator protrusions;
a frame attached to the stator body, a portion of the frame disposed circumferentially between and extending axially along a circumferentially neighboring pair of the plurality of stator protrusions; and
a foil bearing circumscribed by the magnetic bearing stator and including a plurality of foils secured to the portion of the frame, the plurality of foils including a top foil and a bump foil, the bump foil radially between the top foil and the frame, and the bump foil radially between the top foil and at least one of the circumferentially neighboring pair of the plurality of stator protrusions, the top foil including a base and a mount, the base extending circumferentially about the axis between opposing sides, and the mount projecting radially from the base at a connection point circumferentially spaced from the opposing sides.

18. The bearing assembly of claim 17, wherein
the top foil includes a circumferential length between a first side and a second side; and
the connection point is located between fifty percent and eighty percent of the circumferential length of the top foil.

* * * * *